US012100897B2

(12) United States Patent
Wang et al.

(10) Patent No.: US 12,100,897 B2
(45) Date of Patent: Sep. 24, 2024

(54) PHASE COMPENSATED POWER DIVIDER FOR A VERTICAL POLARIZED THREE-DIMENSIONAL (3D) ANTENNA

(71) Applicant: GM Cruise Holdings LLC, San Francisco, CA (US)

(72) Inventors: Yan Wang, Davis, CA (US); Sebastian Mann, Munich (DE); Benedikt Sanftl, Munich (DE)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 108 days.

(21) Appl. No.: 17/708,857

(22) Filed: Mar. 30, 2022

(65) Prior Publication Data

US 2023/0318200 A1 Oct. 5, 2023

(51) Int. Cl.
*H01Q 21/00* (2006.01)
*H01Q 1/50* (2006.01)

(52) U.S. Cl.
CPC .......... *H01Q 21/0006* (2013.01); *H01Q 1/50* (2013.01)

(58) Field of Classification Search
CPC .......... H01Q 1/27; H01Q 1/32; H01Q 1/3233; H01Q 21/0006; H01P 5/107; H01P 5/12
See application file for complete search history.

(56) References Cited

U.S. PATENT DOCUMENTS 9,142,872 B1 * 9/2015 Izadian .................... H01P 3/00
9,343,795 B1 * 5/2016 Halligan .................. H01P 5/16
10,082,570 B1 * 9/2018 Izadian .................. H01Q 13/06
10,826,148 B2 * 11/2020 Takahashi ................ H01P 5/19
11,381,006 B2 * 7/2022 Hollenbeck .......... H01Q 21/068
2013/0141186 A1 * 6/2013 Nguyen .................... H01P 1/00
333/137

(Continued)

FOREIGN PATENT DOCUMENTS

EP 3062384 A1 8/2016

OTHER PUBLICATIONS

European Search Report and Written Opinion for Application No. 22169306.2, mailed on Oct. 21, 2022, 9 pages.

(Continued)

*Primary Examiner* — Jason M Crawford
(74) *Attorney, Agent, or Firm* — Calfee, Halter & Griswold LLP

(57) ABSTRACT

Aspects of the disclosed technology provide solutions for splitting power between different parts of a waveguide. Features inside of a waveguide may include an input and interconnected vertical and horizontal hollow spaces (i.e. channels). Other features may include structures (i.e. septum features) that reflect a portion of electromagnetic energy moving in a channel and may allow another portion of that electromagnetic (EM) energy to pass around those septum features. A horizontal channel of a waveguide may lead to several vertical channel of the waveguide and the septum features may reflect EM energy toward one particular vertical channel such that an amount of EM energy output from that particular vertical channel may be increased as compared to amounts of EM energy output from other vertical channels of the waveguide. Geometries of the waveguide features may focus emitted EM energy by splitting the EM energy into several different parts.

14 Claims, 6 Drawing Sheets

(56) References Cited

U.S. PATENT DOCUMENTS

| | | | | |
|---|---|---|---|---|
| 2013/0154764 | A1* | 6/2013 | Runyon | H01P 11/001 333/135 |
| 2014/0015709 | A1* | 1/2014 | Shijo | H01Q 13/18 342/195 |
| 2015/0123867 | A1* | 5/2015 | Legay | H01Q 25/007 333/137 |
| 2015/0372369 | A1* | 12/2015 | Tatomir | H01P 5/20 333/122 |
| 2017/0244173 | A1* | 8/2017 | Moon | H01Q 13/106 |
| 2019/0190133 | A1* | 6/2019 | Izadian | H01Q 13/20 |
| 2020/0044344 | A1* | 2/2020 | Rogers | H01Q 25/001 |
| 2020/0266510 | A1* | 8/2020 | Menargues Gomez | H01P 1/163 |
| 2021/0249748 | A1* | 8/2021 | Fonseca | H01P 1/161 |
| 2023/0318200 | A1* | 10/2023 | Wang | H01Q 1/50 343/700 R |

OTHER PUBLICATIONS

Li M., et al., “Miniaturized Dual-Band Filter using Triple-Folded Substrate-Integrated Waveguide Resonators,” Microwave and Optical Technology Letters, Jun. 15, 2018, vol. 60, No. 8, pp. 2038-2043.

* cited by examiner

PHASE COMPENSATED POWER DIVIDER FOR A VERTICAL POLARIZED THREE-DIMENSIONAL (3D) ANTENNA

BACKGROUND

1. Technical Field

The present disclosure is generally related to radar antennas. More specifically, the present disclosure is directed to a three-dimensional (3D) radar antenna.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors, and radar elements disposed on the AV.

BRIEF DESCRIPTION OF THE DRAWINGS

Certain features of the subject technology are set forth in the appended claims. However, the accompanying drawings, which are included to provide further understanding, illustrate disclosed aspects and together with the description serve to explain the principles of the subject technology. In the drawings:

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Methods and apparatuses associated with the present disclosure may split power of a radar signal between different parts of a waveguide. A waveguide may include a port through which electromagnetic (EM) energy is received and may include surfaces that reflect (EM) energy within the waveguide. Features inside of a waveguide may include bumps or blocks that cause a height or width of a waveguide to change because these bumps/blocks may act to reflect a portion of EM energy toward a direction. Such blocks or bumps are referred herein as a septum, septums, or septum features. In an instance when a wave guide includes a channel (hollow portion) that extends in a horizontal direction and several other channels (hollow portions) that extend in a vertical direction, septum features included in the waveguide may reflect EM energy toward one particular vertical channel such that an amount of EM energy output from that particular vertical channel may be increased as compared to amounts of EM energy output from other vertical channels of the waveguide. These septum features' shape and their locations may affect an amount of reflected EM energy and an amount of EM energy that is allowed to pass around over the septum features. The reflections of EM energy may also result in a change in phase of EM energy being emitted from the particular vertical channel. Because of this vertically polarized radar signals may be emitted from different parts of a waveguide that have a desired shape, power, and phase relationships. Lengths of specific parts of a channel may also affect how power is split between multiple different emitting elements of an antenna. Geometries used may be adapted for use with specific types of radar signals or frequency of signals.

Figure 1:
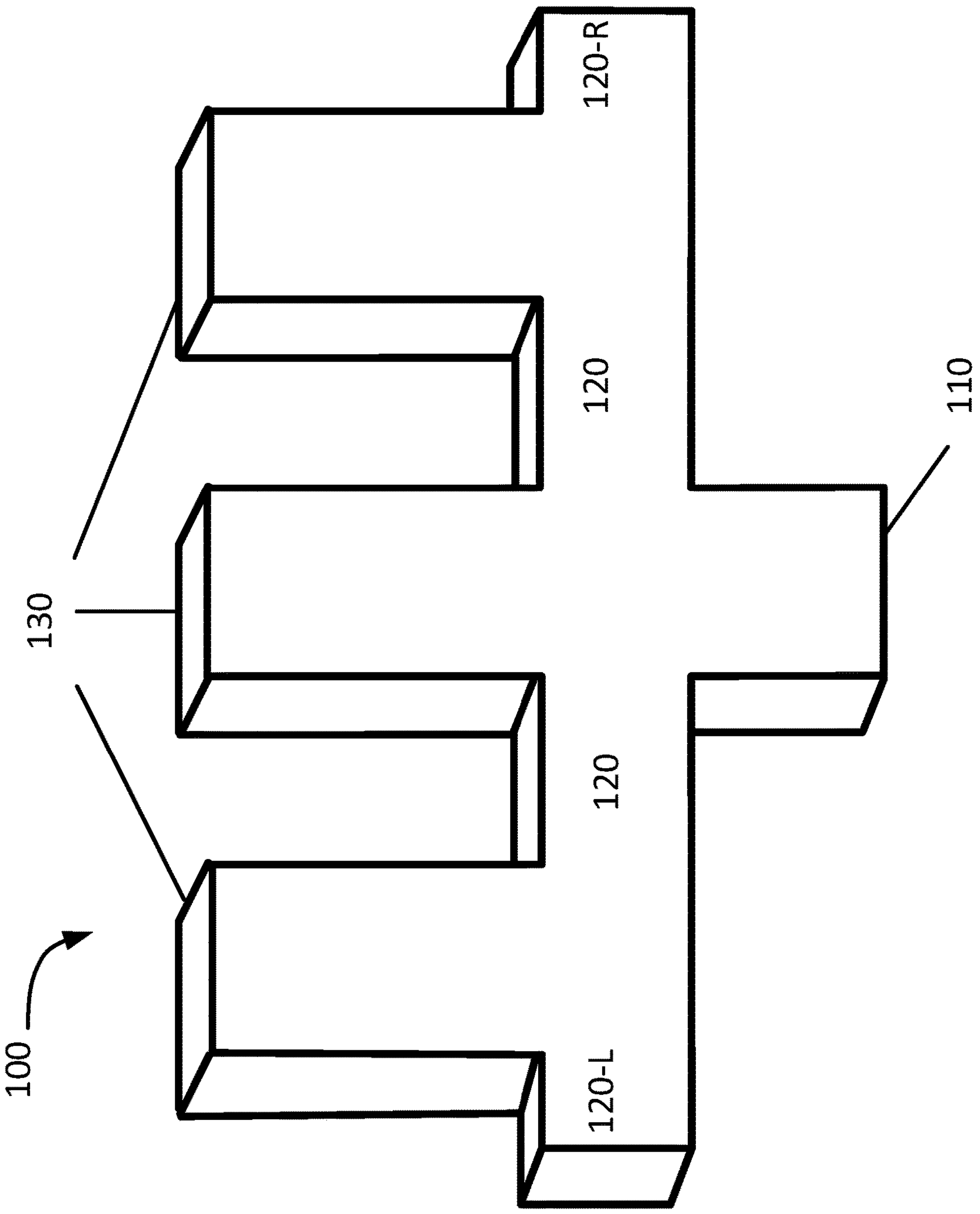
FIG. 1 illustrates a perspective view of a three-dimensional (3D) waveguide antenna that divides power of a radar signal based on the use of an impedance matching network.

FIG. 1 illustrates a perspective view of a three-dimensional (3D) waveguide antenna that divides power of a radar signal based on the use of an impedance matching network. The 3D antenna 100 of FIG. 1 includes an input portion where radar signals are introduced into the waveguide input 110 of the power divider. After entering the 3D waveguide antenna 100 at input port 110, power of the radar signal is split through an E-plane waveguide power divider section of the waveguide 120 that unevenly distributes power of the radar signal to three antenna elements 130 that each output portions of the radar signal power provided to input 110. This allows for radar signal energy to be emitted from the antenna outputs such that each of the antenna elements 130 can emit vertically polarized radar signals with desired magnitude and phase. For an AV application, the magnitude and phase at the three outputs may be chosen to minimize sidelobe level of the far-field radiation in the vertical plane. The antenna can take on the form of the open-ended waveguide and tapered sectoral horns. Once radar energy is introduced via input 100 it may travel in an upward direction, into the power divider channel 120, and into towers 130. Radar energy may then be emitted from the antenna 100 to the outside world via open-ended waveguides or tapered sectoral horns. The shape of the antenna 100 emits radar signals with a vertical polarization. Radar energy may be emitted from holes or openings (not illustrated) located at the top of antenna elements 130.

While antenna 100 could be formed out of a block of metal, antenna 100 may alternatively be manufactured by forming one or more parts of the structure of the antenna 100 by injection molding. For example, a base for the antenna could be made out of plastic that is subsequently coated with a metallic coating. Internal and/or external surfaces of this plastic material could be coated with a metallic material (e.g. nickel, silver, gold, aluminum, or other metal) that reflects radar energy. Here two different pieces of the antenna may be made via injection molding, those pieces could be coated, and then the pieces could be bonded together to form the structure illustrated in FIG. 1. Exemplary coating processes include yet are not limited to a spray process, a sputtering process, or a vapor deposition process. In certain instances, an electrically conductive nickel coating could be sprayed onto surfaces of the antenna, for example using a commercially available conductive nickel spray paint or a gold or palladium coating.

Figure 2B:
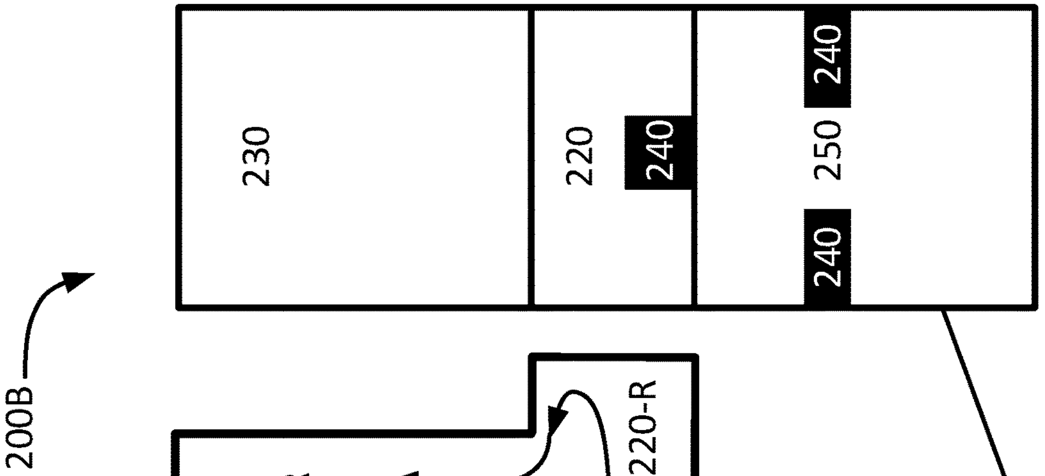
FIG. 2B illustrates a second cross-sectional view of the three-dimensional (3D) waveguide antenna and the power divider of FIG. 1.
Figure 2A:
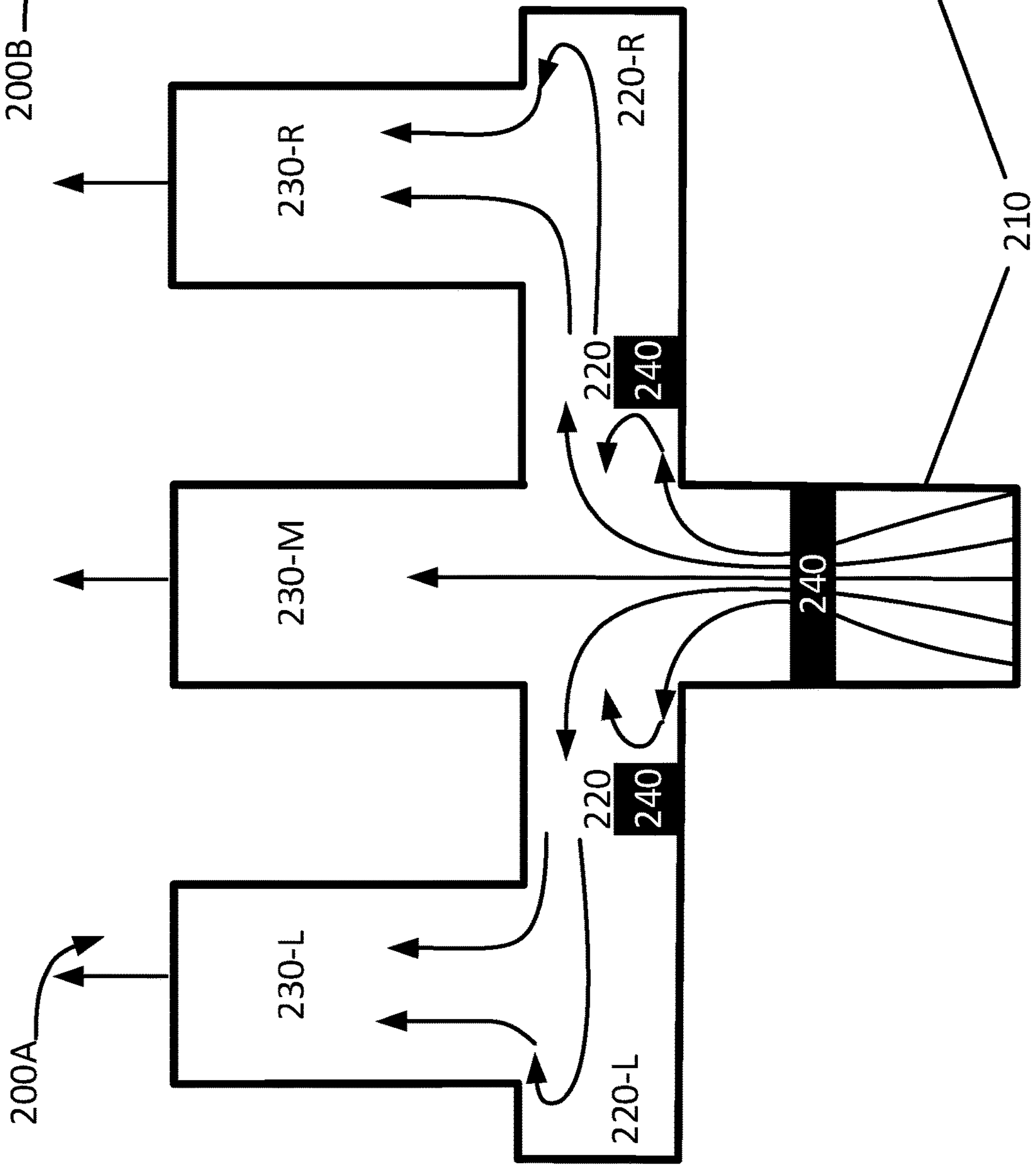
FIG. 2A illustrates a cross-sectional view of the three-dimensional (3D) waveguide antenna and the power divider of FIG. 1.

FIG. 2A illustrates a cross-sectional view of the three-dimensional (3D) waveguide antenna and the power divider of FIG. 1. The cross-sectional side view 200A of FIG. 2A includes input 210, power divider 220, and antenna elements (230-L, 230-M, & 230-R). Septum features 240 included within the power divider 220 and possibly in an input portion of the waveguide act as reactive elements (e.g. a capacitor). A left portion of power divider 220 (i.e. 220-L) extends past a left side of left antenna element 230-L forming a short ended waveguide or stub portion of the waveguide. A right portion of power divider 220 (i.e. 220-R) extends past a right side of right antenna element 230-R forming a second short ended waveguide or stub portion of the waveguide. Dimensions associated with septum features 240 and short ended waveguides tune impedances of a waveguide. Impedances of the waveguide may vary depending on heights or width of septum features 240 as well as a distance that a septum feature is from a center of a waveguide. The length and width of a short-ended waveguide may also affect the tuning of the waveguide impedance.

The tuning of the waveguide affects how power of a radar signal is divided between the three different antenna elements 230-L, 230-M, & 230-R. This tuning may affect magnitudes and phase relationships of signals emitted from the different antenna elements 230-L, 230-M, & 230-R. The arrowed lines included in the waveguide are indicative of waves of radar energy moving through an interior of waveguide antenna 200A. The arrowed lines that exit the waveguide antenna 200A through the top side of antenna elements 230-L, 230-M, & 230-R may exit through holes (i.e. openings in the waveguide) located in each of these antenna elements. Note that the waves of radar signal energy must move around or between septum elements as radar signals move through the waveguide 200A.

FIG. 2B illustrates a side cross-sectional view 200B of the waveguide antenna 200A. This side view 200B includes input 210, septum elements 240, power divider 220, and an antenna element 230.

Figure 2C:
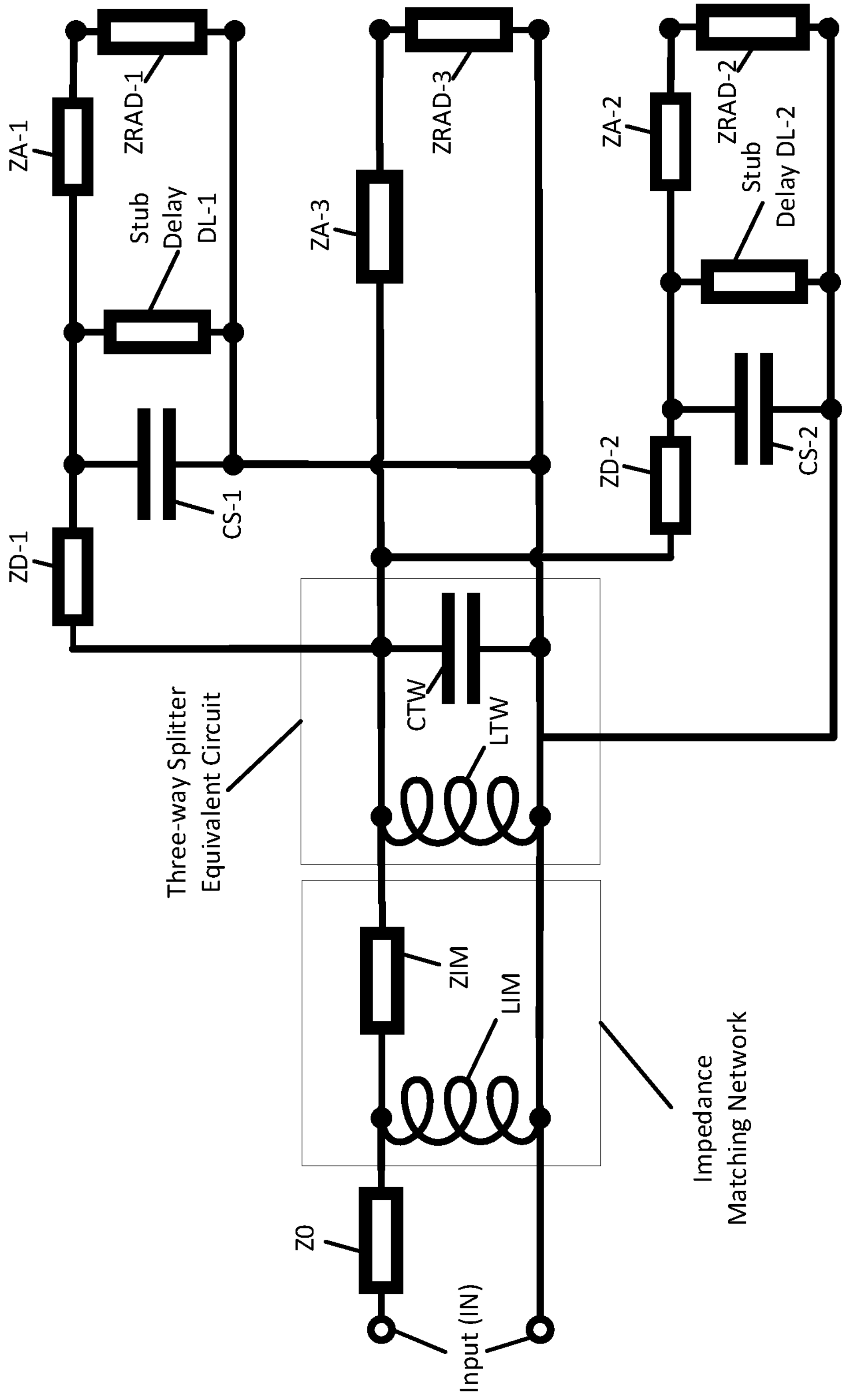
FIG. 2C illustrates an equivalent circuit that may be used to model the waveguide antenna 200A of FIGS. 2A & 2B.

FIG. 2C illustrates an equivalent circuit that may be used to model the waveguide antenna 200A of FIGS. 2A & 2B. Note that this equivalent circuit includes capacitors (CTW & CS), inductors (LIM & LTW), and different impedances (Z0, ZIM, ZD, ZA, & ZRAD). Energy of the radar signal that enters the waveguide through the input on the left side of FIG. 2C through impedance Z0 and to an impedance matching network that includes inductor LIM and impedance ZIM. Shapes associated with potentially septum feature sizes included in an input portion IN of a waveguide may be adjusted to affect values of impedance Z0, inductance LEVI, and impedance ZIM.

After a radar signal passes through the impedance matching network of FIG. 2, it may pass into a circuit that includes inductor LTW and capacitor CTW that form an equivalent circuit of a three-way power divider (or splitter) portion of the waveguide. Values of inductor LTW and capacitor may be associated with shapes and sizes of the power divider 220 portion of waveguide 200A. Outputs of the three way power divider equivalent circuit provide radar energy to three circuits that are represented in the equivalent circuit by different impedances and capacitances. One output from the three-way equivalent circuit goes to a circuit that includes impedance ZD-1, capacitor CS-1, delay line DL-1 (i.e. a stub delay), impedance ZA-1, and impedance ZRAD-1. A second output from the three-way equivalent circuit goes to a circuit that includes impedance ZD-2, capacitor CS-2, a delay line DL-2 (i.e a stub delay), impedance ZA-2, and impedance ZRAD-2. A third output from the three-way equivalent circuit goes to a circuit that includes impedances ZA-3 and ZRAD-3.

These three different circuits may be used to model magnitudes and phases of radar signal energy that travel to and that are emitted by the three different antenna elements 230-L, 230-M, and 230-R of FIG. 2. Impedances ZD-1, ZD-2, ZA-1, ZA-1, ZA-2, ZRAD-1, ZRAD-2, and ZRAD-3 may be functions of the dimensions of various elements of antenna 200A of FIG. 2. Values of capacitance of capacitors CS-1 and CS-2 may be a function of heights or widths of septum features 240. Impedances ZRAD-1, ZRAD-2, and ZRAD-3 may correspond to a output impedance of antenna elements 230-L, 230-M, and 230-R. Stub delays DL-1 and DL-2 may be a function of a length of stub elements 220-L and 220-R of the antenna 200A of FIG. 2.

Geometries of antenna 200A may be tuned to specific sets of radar frequencies, for example to a band of frequencies that span from 76 GHz to 81 GHz or to frequencies of about 120 GHz.

As mentioned above, the arrowed lines within cross-sectional view 200A the waveguide antenna represent electromagnetic energy or waves that flow through internal hollow portions of the waveguide antenna. Note that this energy represented by the arrowed lines moves through hollow spaces in the power divider: in an upward direction from input 210, in left and right directions along channel 220, and in an upward direction into vertical channels of antenna elements 230. Note that some of this electromagnetic energy is reflected off of internal features of the wave guide that include short-ended waveguides and spectrum features 240.

FIG. 2B illustrates a second cross-sectional view of the three-dimensional (3D) waveguide antenna of FIG. 1. Side view 200B is an edge of the antenna input 210 only one of the three antenna elements 230 of FIG. 2A is visible. This side view 200B includes a line that represents a boundary point between horizontal channel 220 and tower 230. A bottom portion of channel 220 illustrates a point where input 210 ends and channel 220 begins.

Figures 3A, 3B:
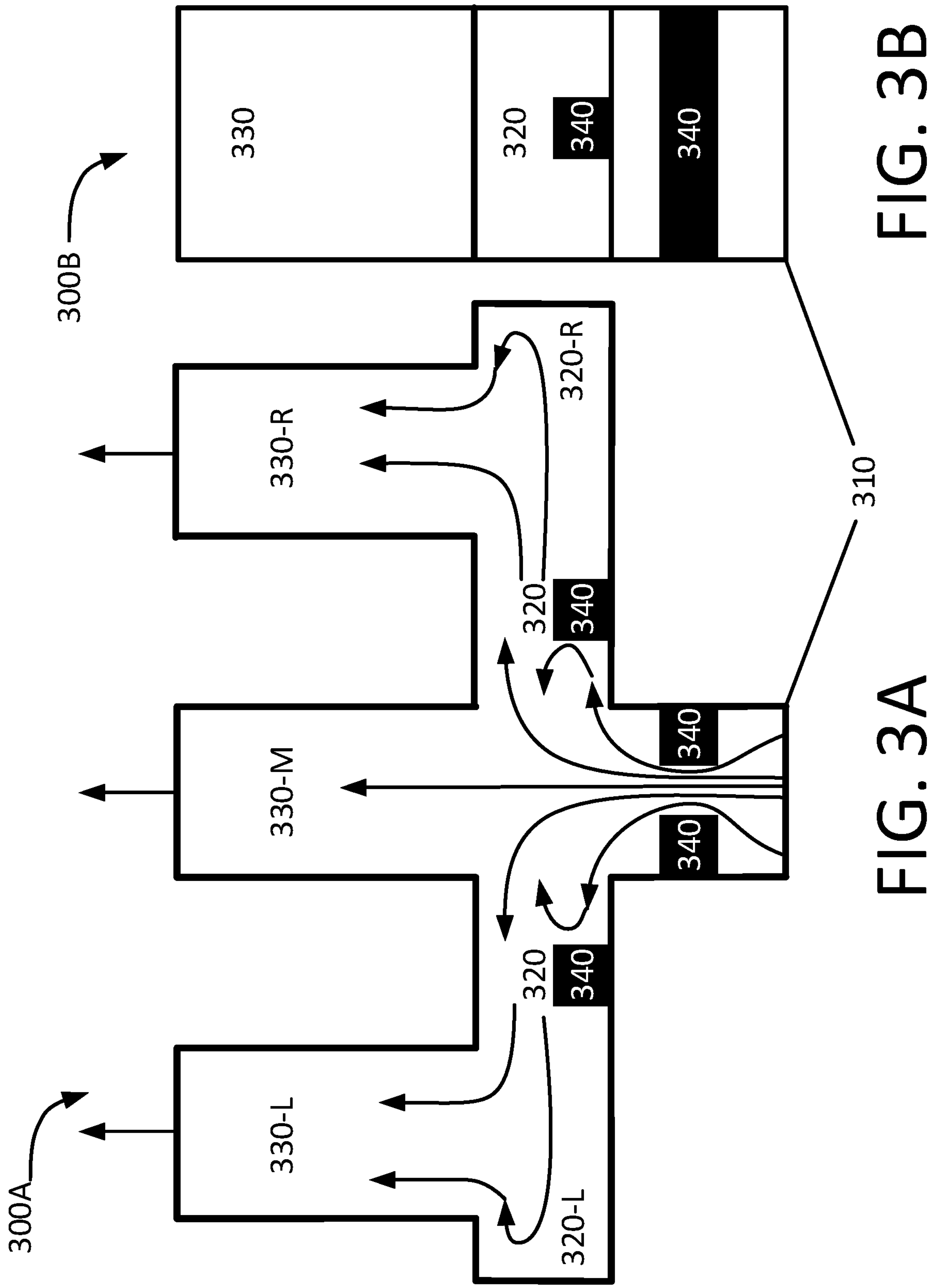
FIG. 3A illustrates a side cross-sectional view of a three-dimensional (3D) waveguide antenna that has features that are similar to yet slightly different from the features of the waveguide antenna of FIG. 2
FIG. 3B illustrates an end cross-sectional view of a three-dimensional (3D) waveguide antenna that has features that are similar to yet slightly different from the features of the waveguide antenna of FIG. 2

FIGS. 3A & 3B illustrate cross-sectional views of a three-dimensional (3D) waveguide antenna that has features that are similar to yet slightly different from the features of the waveguide antenna of FIG. 2. FIG. 3A includes a side cross-sectional view 300A of the waveguide antenna. FIG. 3B includes an end view 300B of the waveguide antenna. The waveguide antenna of FIG. 3 includes input 310, power divider section 320, spectrum features 340, antenna elements 330, and antenna stub portions 320-L & 320-R that are very similar to elements of the waveguide antenna of FIG. 2. Here however, the spectrum features 340 may be shaped and have the same wall thickness as other parts of the waveguide antenna where the spectrum features 240 of FIG. 2 may be solid pieces. FIG. 3 also includes a change in width of the waveguide where input 310 has a different width than a second part 350 of the waveguide. This change in width near the input of the waveguide may also adjust impedances associated with the waveguide antenna. FIG. 3 also includes arrowed lines that represent waves of radar energy moving into, moving through, and being emitted out of the waveguide antenna 300A.

Figure 4B:
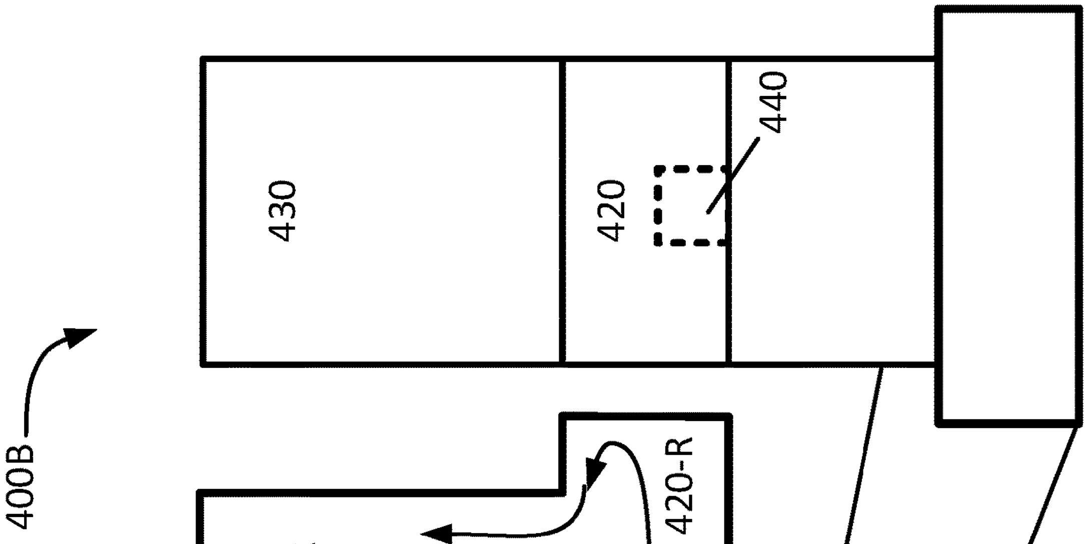
FIG. 4B illustrates an end cross-sectional views of a three-dimensional (3D) waveguide antenna that has features that are similar to yet slightly different from the features of the waveguide antenna of FIG. 3.
Figure 4A:
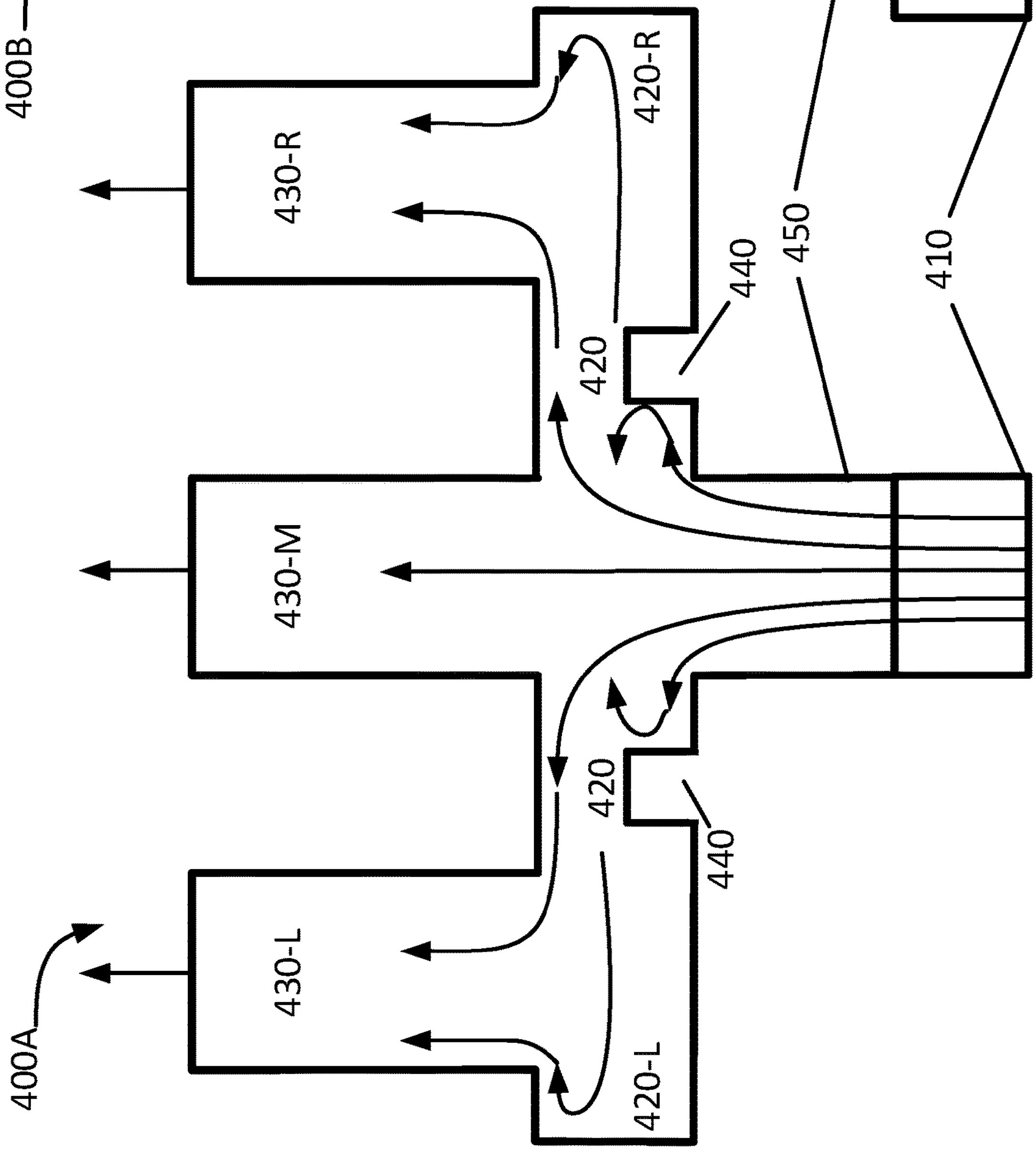
FIG. 4A illustrates a side cross-sectional views of a three-dimensional (3D) waveguide antenna that has features that are similar to yet slightly different from the features of the waveguide antenna of FIG. 3.

FIGS. 4A & 4B illustrate cross-sectional views of a three-dimensional (3D) waveguide antenna that has features that are similar to yet slightly different from the features of the waveguide antenna of FIG. 3. FIG. 4A includes a side cross-sectional view 400A of the waveguide antenna. FIG. 4B includes an end view 400B of the waveguide antenna. The waveguide antenna of FIG. 4 includes input 410, power divider section 420, spectrum features 440, antenna elements 430, and antenna stub portions 440-L & 420-R that are very similar to elements of the wave guide antenna of FIG. 2. Some of the spectrum features 440 of FIG. 4 have a slightly different orientation than the spectrum features 340 of FIG. 2.

Figure 5:
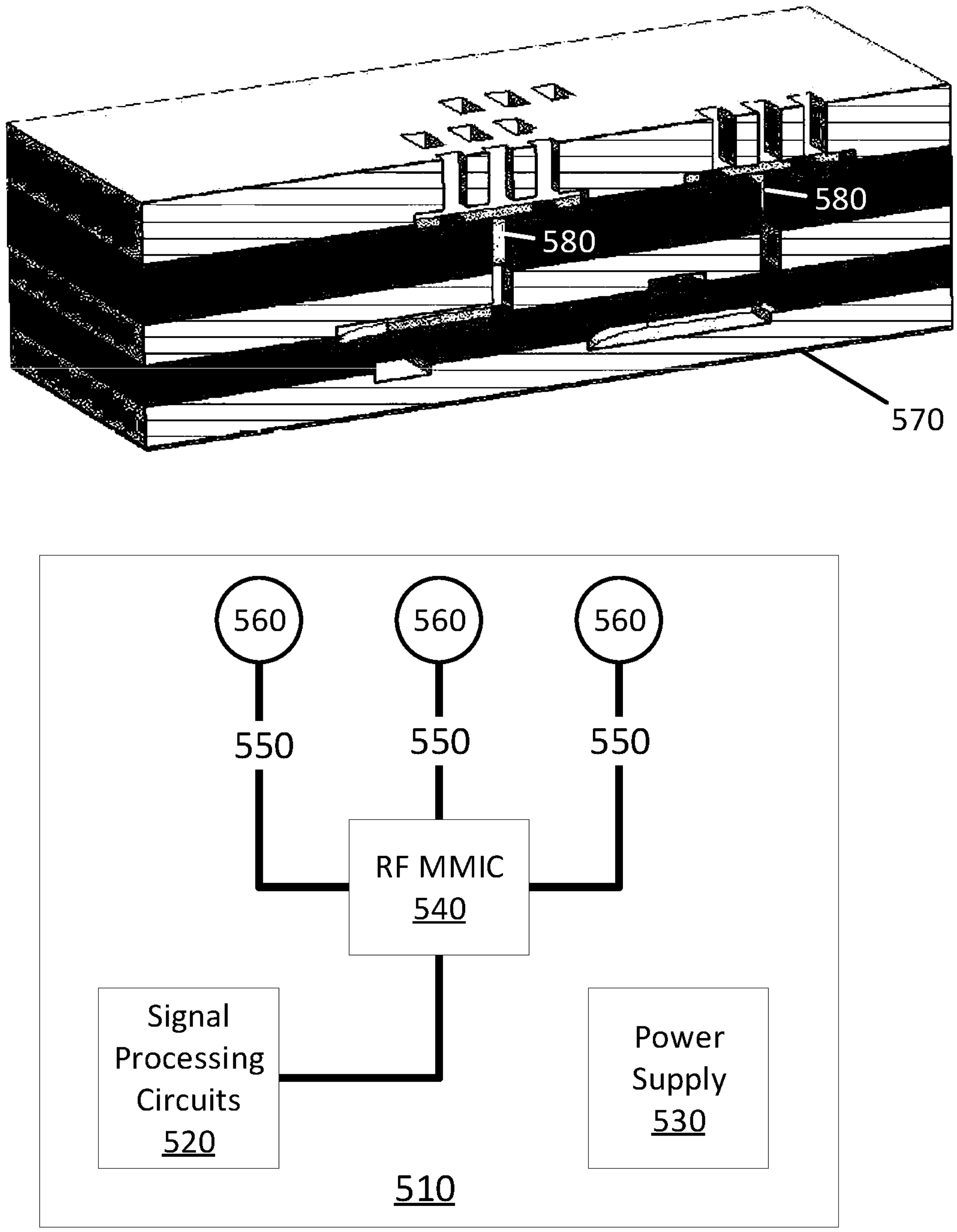
FIG. 5 illustrates circuits that may be coupled to a substrate that includes an array of vertically polarized waveguide antennas.

FIG. 5 illustrates circuits that may be coupled to a substrate that includes an array of vertically polarized waveguide antennas. FIG. 5 includes circuit assembly 510 that may be included in a printed circuit board assembly (PCBA), a multichip module, or a monolithic microwave integrated circuit (MMIC). The circuit assembly 510 of FIG. 5 includes a set of signal processing circuits 520, a power supply 530, a radio frequency (RF) MIMIC chip 540, transmission lines 550, and waveguide interface transition components 560. In operation, signal processing circuits may send signals to and possibly receive signals from radio frequency MIMIC 540. Radio frequency MMIC 540 may send signals using transmission lines 550 to waveguide interface transmission components 560 such that radar energy may be passed to an array of waveguide antennas.

FIG. 5 also includes substrate 570 that includes an array of waveguide antennas 580. Openings 590 in the top of substrate 570 are locations where radar energy is emitted from waveguide antennas 580.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general-purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

What is claimed is:

1. A waveguide antenna, the waveguide antenna comprising:

a first portion of that extends in a first direction, wherein the first portion of the waveguide receives electromagnetic energy;

a second portion that extends in a second direction that is perpendicular to the first direction and that receives the electromagnetic energy from the first portion of the waveguide, wherein the second portion of the waveguide antenna includes a set of features that change a cross-sectional area of the second portion of the waveguide to tune the waveguide antenna;

a set of antenna elements of the waveguide antenna that extend in a direction that is perpendicular to the second direction, wherein the set of antenna elements consists of a left antenna element, a middle antenna element, and a right antenna element and the first portion is centered on the second portion in line with the middle antenna element and equidistant from the left antenna element and the right antenna element, wherein:

the electromagnetic energy received by the second portion of the waveguide is divided into a first part that moves toward the left antenna element, a second part that moves toward the middle antenna element, and a third part that moves toward the right antenna element based on the set of features that that change the cross-sectional area of the second portion of the waveguide to tune the waveguide antenna, and some of the second part of the divided electromagnetic energy moves into the middle antenna element;

a first stub portion of the waveguide that extends to the left of the left antenna element from the second portion of the waveguide, wherein some of the first part of the divided electromagnetic energy moves into the first stub portion of the waveguide; and a second stub portion of the waveguide that extends to the right of the right antenna element from the second portion of the waveguide, wherein some of the third part of the divided electromagnetic energy moves into the second stub portion of the waveguide.

2. The waveguide antenna of claim 1, wherein the set of features area associated with a capacitance.

3. The waveguide antenna element of claim 1, wherein the set of features tune the waveguide antenna based on at least one of a height or a width associated with the set of features.

4. The waveguide antenna of claim 1, wherein a second set of features are disposed along the first portion of the waveguide antenna that change in a cross-sectional area of the first portion of the waveguide antenna.

5. The waveguide antenna of claim 1, further comprising a second waveguide that includes a first portion, a second portion, and three different antenna elements that have dimensions that match respective dimensions of the first antenna portion, the second antenna portion, and the three antenna elements of the waveguide antenna.

6. The waveguide antenna of claim 5, wherein the second portion of the second waveguide include a set of features that change a cross-sectional are of the second portion of the second waveguide.

7. The waveguide antenna of claim 5, further comprising arranging the waveguide and the second waveguide into an array to form a multi-stage impedance matching network that increases an input impedance bandwidth.

8. The waveguide antenna of claim 7, further comprising a substrate that includes the array of waveguide elements.

9. The waveguide antenna of claim 1, a plurality of additional waveguides that each include a first portion, a second portion, and three different antenna elements that have dimensions that match respective dimensions of the first antenna portion, the second antenna portion, and the three antenna elements of the waveguide.

10. The waveguide antenna of claim 1, further comprising a printed circuit board that provides the electromagnetic energy to the first portion of the waveguide antenna.

11. The waveguide antenna of claim 1, wherein the left antenna element, the middle antenna element, and the right antenna element each have a tapered that forms a horned shape.

12. The waveguide antenna of claim 1, wherein the set of features include a first feature and a second feature, wherein the first feature is located on the second portion between the left antenna element and the middle antenna element, and wherein the second feature is located on the second portion between the right antenna element and the middle antenna element.

13. The waveguide antenna of claim 1, wherein the set of features include a first feature and a second feature, wherein the first feature is located on a first side of the first portion and the second feature is location a second side of the first portion that is facing the first side.

14. The waveguide antenna of claim 1, wherein the first stub portion extends the second portion in the second direction to the left of the left antenna element and the first stub portion has a same cross-sectional area as the second portion, and wherein the second stub portion extends the second portion in the second direction to the right of the right antenna element and the first stub portion has a same cross-sectional area as the second portion.

* * * * *